(12) United States Patent
Harms

(10) Patent No.: US 12,360,570 B2
(45) Date of Patent: Jul. 15, 2025

(54) UNDERWATER CONTROLLER GRIP FOR A DEVICE SEALED INSIDE A WATERPROOF CASE

(71) Applicant: Bjorn Harms, Cherry Hill, NJ (US)

(72) Inventor: Bjorn Harms, Cherry Hill, NJ (US)

(73) Assignee: Pioneer & Co., Inc., Moorestown, NJ (US)

( * ) Notice: Subject to any disclaimer, the term of this patent is extended or adjusted under 35 U.S.C. 154(b) by 265 days.

(21) Appl. No.: 18/303,752

(22) Filed: Apr. 20, 2023

(65) Prior Publication Data

US 2023/0341906 A1    Oct. 26, 2023

Related U.S. Application Data

(60) Provisional application No. 63/332,927, filed on Apr. 20, 2022.

(51) Int. Cl.
| | | |
|---|---|---|
| *G06F 1/16* | (2006.01) | |
| *G01C 5/06* | (2006.01) | |
| *H04B 1/3888* | (2015.01) | |
| *H04W 4/80* | (2018.01) | |
| *H04W 12/50* | (2021.01) | |

(52) U.S. Cl.
CPC ............. *G06F 1/1656* (2013.01); *G01C 5/06* (2013.01); *H04B 1/3888* (2013.01); *H04W 4/80* (2018.02); *H04W 12/50* (2021.01)

(58) Field of Classification Search
CPC .... G06F 1/1628; G06F 1/1629; G06F 1/1632; H04B 1/3888
See application file for complete search history.

(56) References Cited

U.S. PATENT DOCUMENTS

| | | | | |
|---|---|---|---|---|
| 5,873,814 | A * | 2/1999 | Adair ................. | A61B 1/00052 600/109 |
| 6,844,845 | B1 * | 1/2005 | Whiteside .............. | H05K 5/061 455/347 |
| 7,609,512 | B2 * | 10/2009 | Richardson .......... | H05K 5/0247 361/679.02 |
| 8,094,229 | B2 * | 1/2012 | Misawa ............... | H04N 23/651 348/333.01 |
| 8,244,299 | B1 * | 8/2012 | Bishop ................ | H04M 1/0281 455/556.1 |
| 9,213,218 | B1 * | 12/2015 | Coons .................... | G03B 17/08 |
| 9,332,170 | B1 * | 5/2016 | Khalili ................... | F16M 11/10 |
| 9,590,685 | B1 * | 3/2017 | Ben Yehuda ........ | H04B 1/3877 |
| D787,499 | S * | 5/2017 | Lee .............................. | D14/253 |

(Continued)

*Primary Examiner* — Adrian S Wilson
(74) *Attorney, Agent, or Firm* — Saul Ewing LLP

(57) ABSTRACT

An underwater controller grip for a device includes a controller comprising a radio module configured to provide a short-range wireless connection between the controller and the device and a mounting tray to contain the radio module, the mounting tray configured to maintain the short-range wireless connection while underwater. The underwater controller grip also includes an integrated pressure sensor configured to continuously measure water depth and transmit, via the radio module, measured water depth to the device. The device issues a signal based on the measured water depth and a time variable. The signal includes an alert of a user's no decompression stop time, a bottom time, an ascent rate, a surface interval time, a no-fly time, a dive log, or a combination thereof.

20 Claims, 17 Drawing Sheets

(56) References Cited

U.S. PATENT DOCUMENTS

| | | | |
|---|---|---|---|
| 9,671,680 B2* | 6/2017 | Kamiya | G03B 17/04 |
| D799,465 S * | 10/2017 | Sukphist | D14/253 |
| 10,261,395 B2* | 4/2019 | Benvenuti | G03B 17/08 |
| 10,344,999 B2* | 7/2019 | Shamoon | H04L 12/2825 |
| D883,368 S * | 5/2020 | Zhan | D16/239 |
| D889,528 S * | 7/2020 | Kowalski | D16/242 |
| 12,160,538 B2* | 12/2024 | Chen | F16M 11/18 |
| 12,210,271 B2* | 1/2025 | Chen | F16M 11/205 |
| 2002/0136557 A1* | 9/2002 | Shimamura | G06F 1/1626 |
| | | | 206/316.2 |
| 2007/0071423 A1* | 3/2007 | Fantone | G03B 17/08 |
| | | | 396/27 |
| 2009/0017884 A1* | 1/2009 | Rotschild | H04M 1/18 |
| | | | 455/575.8 |
| 2009/0317069 A1* | 12/2009 | Yim | G03B 17/08 |
| | | | 396/27 |
| 2010/0227605 A1* | 9/2010 | Fournier | H04L 63/123 |
| | | | 455/419 |
| 2012/0262618 A1* | 10/2012 | Weakly | G06F 1/1632 |
| | | | 348/E5.022 |
| 2013/0025904 A1* | 1/2013 | Berumen | G06F 1/1626 |
| | | | 29/428 |
| 2014/0104447 A1* | 4/2014 | Woodman | H04N 23/50 |
| | | | 348/375 |
| 2014/0313358 A1* | 10/2014 | Yu | H04N 23/64 |
| | | | 348/211.7 |
| 2016/0219367 A1* | 7/2016 | Florczak | H04M 1/72412 |
| 2017/0054466 A1* | 2/2017 | Flores | H04M 1/04 |
| 2018/0088443 A1* | 3/2018 | Riddiford | G03B 11/06 |
| 2018/0338022 A1* | 11/2018 | Penfold | G03B 17/561 |
| 2019/0253589 A1* | 8/2019 | Kraemer | G06F 1/1609 |
| 2019/0369465 A1* | 12/2019 | Woodman | H04N 23/661 |
| 2021/0028806 A1* | 1/2021 | Tsoi | H04M 1/724092 |
| 2022/0300040 A1* | 9/2022 | Harms | G06F 3/033 |
| 2022/0317737 A1* | 10/2022 | Ding | H04M 1/0279 |
| 2023/0209199 A1* | 6/2023 | Chen | F16M 11/18 |

* cited by examiner

UNDERWATER CONTROLLER GRIP FOR A DEVICE SEALED INSIDE A WATERPROOF CASE

PRIORITY

This application claims the benefit of U.S. Provisional 63/332,927, filed Apr. 20, 2022, which is hereby incorporated by reference.

FIELD OF THE INVENTION

The present invention relates to an underwater device, and, more particularly, to system and methods for controlling inputs to a capacitance interface.

BACKGROUND

Today's smartphone devices, such as an iPhone® or an Android® device, are marketed as being dust-resistant and/or water-resistant. Typically, a water or dust resistant device will be provided with a rating that indicates how long a device may be submerged without suffering from any type of damage. For example, a device may be provided with a rating of IP68, which is an international standard rating indicating that the device is resistant to submersion up to a maximum depth of 1.5 meters underwater for up to 30 minutes.

What is needed is a waterproofing solution for smartphone devices to enable usage of the devices in underwater environments for extended periods of time. While prior art solutions have allowed for the manipulation of a touchscreen in wet environments, these solutions typically rely on flexible membranes and/or oil-filled dielectric layers, which have depth and user-interface limitations.

BRIEF SUMMARY

The present embodiments may relate to, inter alia, systems and methods for providing a wireless mouse interface with a smartphone/tablet and remote controls application but integrated into an underwater controller grip. The cursor-moving, selection-making device may be anything that moves the smartphone/tablet's cursor in a X and Y manner, like an optical or mechanical trackball, mouse, joystick, touchpad or up/down/left/right buttons, or the like. The user may control an input device on the interface of the controller grip to move the cursor and select objects/functions on the smartphone/tablet, allowing the user to remotely operate native applications installed on a smartphone/tablet that is sealed inside an underwater case attached to the controller grip.

A method for using a controller grip in an underwater environment is also provided. The method may comprise placing a user computing device in a case having at least one waterproof seal and attaching the case to a controller grip. The method may further comprise pairing the user computing device with a controller comprising a non-volatile memory and processor, the controller comprising, a radio module configured to provide a short-range wireless connection between the controller and the user computing device, and an integrated connection module configured to activate the user computing device, and receiving one or more inputs from a user through an input component connected to the controller grip, and transmitting an instruction to the user computing device based on the one or more inputs.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION

Figure 1:
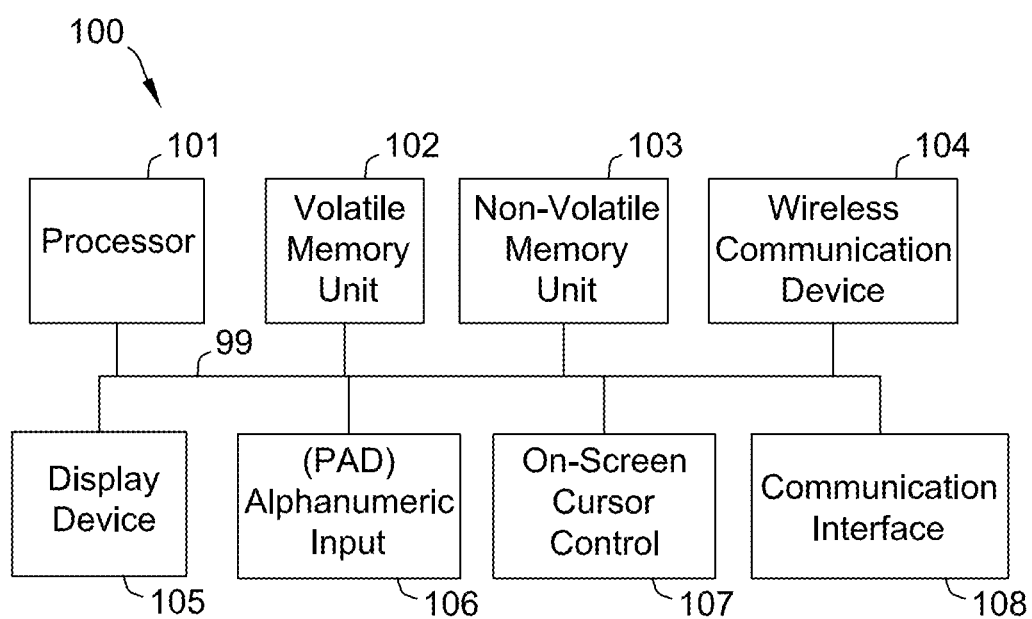
FIG. 1 illustrates circuitry of an exemplary portable computing device in accordance with one embodiment of the present disclosure.
Figure 2:
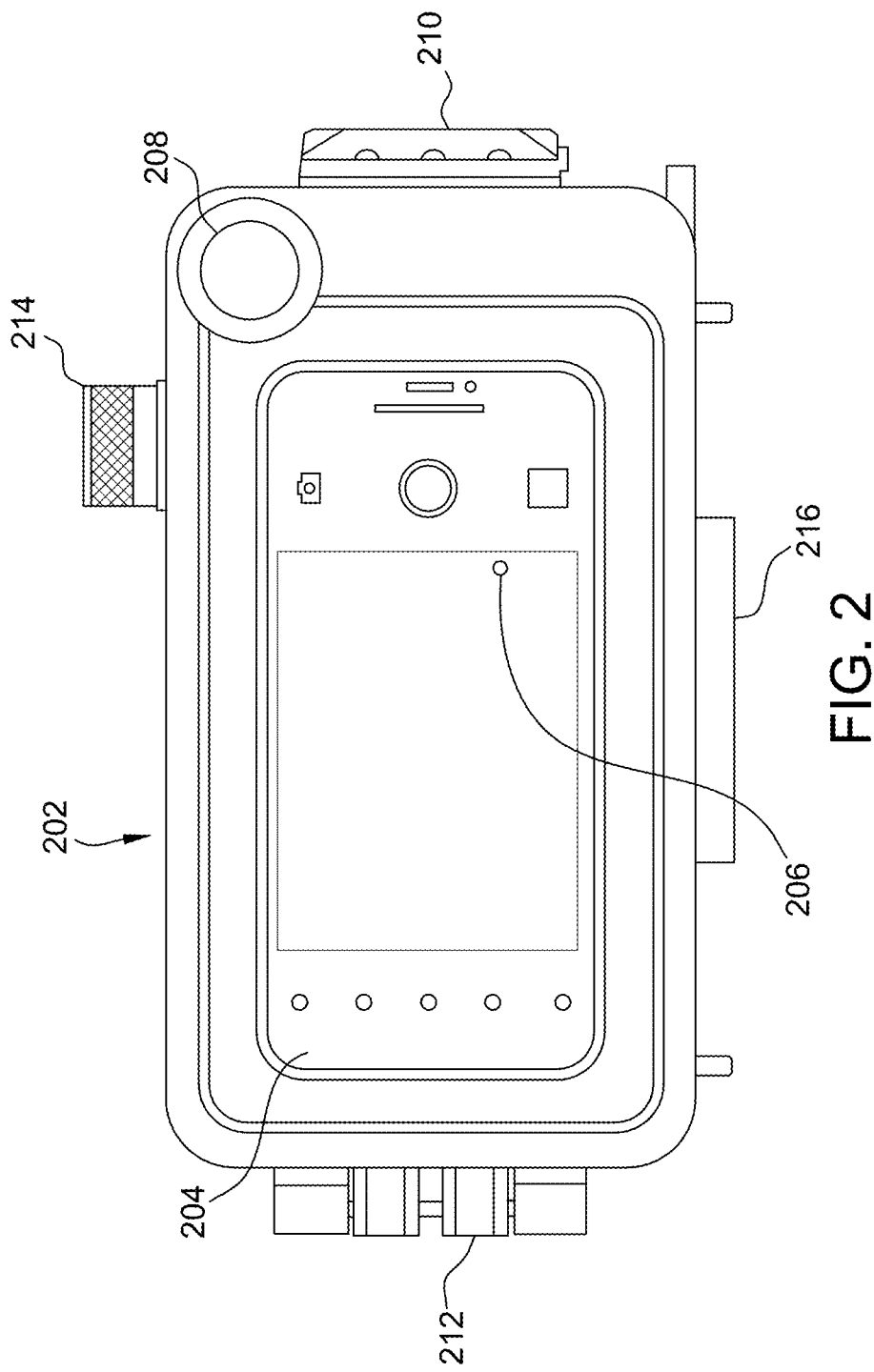
FIG. 2 illustrates a rear view of an exemplary case in accordance with an embodiment of the present disclosure.

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing", "outputting", "generating", "receiving", "transmitting", "determining", "using" or the like, refer to the actions and processes of a computer system, or similar electronic device including a personal digital assistant (PDA). The computer system or similar electronic computing device manipulates and transforms data represented as physical (electronic) quantities within the computer system's registers and memories into other data similarly represented as physical quantities within the computer system memories or registers or other such information storage, transmission, or display devices.

With reference now to FIG. 1, it should be appreciated that portions of the present method and system are comprised of computer-readable and computer-executable instructions which reside, for example, in computer-usable media of a portable computer system. FIG. 1 illustrates an exemplary portable computer system 100. It is appreciated that system 100 of FIG. 1 is only exemplary and that the present invention can operate within a number of different portable computing devices, personal digital assistants (PDAs), pager, portable telephone, and the like.

FIG. 1 illustrates circuitry of an exemplary portable computing device 100 in accordance with one embodiment of the present invention. Portable computer system 100 includes an address/data bus 99 for communicating information, a central processor 101 coupled with the bus 99 for processing information and instructions, a volatile memory unit 102 (e.g., random access memory, static RAM, dynamic RAM, etc.) coupled with the bus 99 for storing information and instructions for the central processor 101 and a non-volatile memory unit 103 (e.g., read only memory, programmable ROM, flash memory, EPROM, EEPROM, etc.) coupled with the bus 99 for storing static information and instructions for the processor 101. Computer system 100 also includes a wireless communication device 104 coupled to the bus 99 for wirelessly transmitting and receiving information from other devices. It should be understood that wireless communication device 104 may include radio frequency (RF) technology such as Bluetooth communication technology, IEEE 802.11 technology, or HomeRF technology. Wireless communication device 104 can also include an infrared communication port. System 100 also contains a display device 105 coupled to the bus 99 for displaying information to the portable computer user.

Also included in portable computer device 100 of FIG. 1 is an optional alphanumeric input device 106 which in one implementation is a handwriting recognition pad ("digitizer") having different regions, for instance. Device 106 can communicate information and command selections to the central processor 101. System 100 also includes an optional cursor control or directing device 107 coupled to the bus 99 for communicating user input information and command selections to the central processor 101. In one implementation, device 107 includes a touch screen interface incorporated with screen 105. Device 107 may be capable of registering a position on the screen 105 where a stylus makes contact, for example, or may be controlled by an application running on device 107. The display device 105 utilized with the computer system 100 may be a liquid crystal device (LCD) or other display device suitable for creating graphic images and alphanumeric characters recognizable to the user. Portable computer system 100 also includes a communication interface 108, which is also coupled to bus 99, and can be a serial port for communicating with a cradle (not shown) for system 100.

In some embodiments the underwater case may be designed to fit most smartphones/tablets. Once the smartphone/tablet is sealed inside the waterproof case, the user cannot touch the smartphone/tablet side buttons or touchscreen display. The following solution allows the user to remotely control and operate native applications on the smartphone/tablet when it is sealed inside the underwater case. The underwater case may have an integrated Bluetooth®, near-field communications (NFCs) and/or any radio frequency transmitter used to wirelessly connect, communicate with and control applications on a smartphone/tablet.

The underwater case may have an integrated controller that is used to remotely move the cursor on the smartphone/tablet display in a X and Y manner and select the object/function on the smartphone/tablet. This may be, for example, an X-Y-axis or X-Y-Z-axis movement device, like an optical or mechanical trackball, mouse, joystick, touchpad or up/down/left/right buttons. The user may move the cursor on the display interface on the underwater case, which, in turn, moves the cursor in the same direction on the smartphone/tablet display. As the cursor hovers over the intended touch screen target, the user may remotely select the target to operate the application.

In some embodiments, a user may control an input cursor via a joystick. For example, an input cursor on an interface of the underwater case may move on an x-y axis corresponding to input by a user of the device. Via the joystick, the user may perform a selection operation to control a native application of the smartphone device, as described herein.

Selecting ("clicking") the target may be achieved in a couple of ways. The input cursor may have Z-axis movement, so pushing or pulling the cursor may send a select command to the smartphone/tablet. A separate button, lever or switch integrated into the underwater case may be used to send select command to the smartphone/tablet.

The underwater case may have one or more waterproof seals that function to separate wet mechanical areas from dry electronic areas of the device. In some embodiments, the case may remotely operate native smartphone/tablet applications. For example, the underwater case may remotely operate applications including, but not limited to, camera app, photo/video gallery app, music app, 3D scanning app, movie app, sound recorder app, Settings app, etc. Radio waves do not travel through water, and thus the wireless underwater case must be integrated into the underwater case in such a way that little to no water comes between the smartphone/tablet and an integrated controller of the case whilst in the underwater environment.

It will be appreciated by those skilled in the art that the case described herein may be an underwater case but may also be suitable for other applications where a mobile device, for example needs to be in a sealed case. For example, the case may be used in any environment that could experience extremes in temperature and/or debris or fluids. Examples include, but are not limited to, industrial sites that create dust, meat processing plants, chemical manufacturing, crime scenes, construction sites, food preparation, and the like.

FIGS. 2-5 illustrate a rear view of an exemplary case 202 in accordance with multiple embodiments. As shown, exemplary case 202 encapsulates user computing device 204. Once a connection is established between case 202 and device, such as via a short-range wireless connection, a user may be provided with an interface and shown cursor 206. Cursor 206 may be controlled via an input control component, such as trackball 208. The underwater case 202 may include a door that may be sealed using an open/close mechanism 210 via door hinge 212. The door, which serves as the rear wall of case 202, may include a transparent window to provide a clear view of user computing device 204's screen. Mechanism 210 may include, for example, a cam-action closing lock to seal case 202 shut. Port 214 provides a vacuum pressure port. In some embodiments, port 214 may be used to conduct leak test analysis of the case. Tripod mount 216 may provide for the attachment of different accessories. Accessories may include, but are not limited to, a tripod, a selfie-stick, a handheld mount, or the like.

Although the use of a hinge is discussed herein, the case may not comprise a hinge. For example, the case may still comprise two pieces that may be joined be mechanical means such as clips, locks, screws, and other mechanical attachment means. Similarly, the case pieces may be joined by magnetics or other non-mechanical means. The case may also allow for the side insertion of a device and may, for example, be a unitary case have a door or other removeable, or partially removable, side which would allow a device to be eventually enclosed by the case.

As described, user computing device 204 may include, but is not limited to, a smartphone device, a tablet device, a camera, underwater equipment, PDA, or the like. Input control components may include, but are not limited to, trackballs, remove input devices, a joystick, trackpad, or the like.

Figure 3:
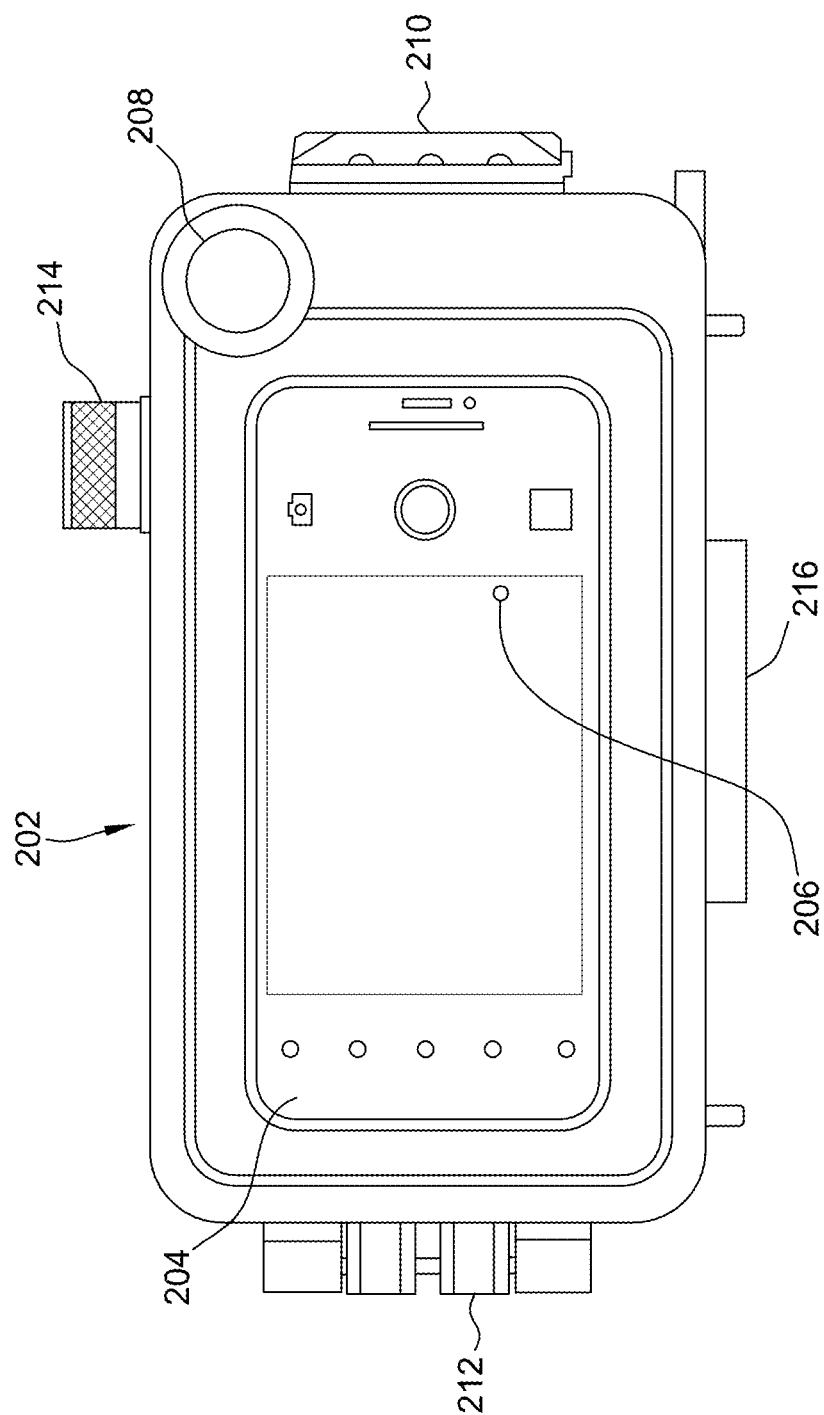
FIG. 3 illustrates an alternative rear view of the exemplary case in accordance with another embodiment of the present disclosure.

As illustrated in FIG. 3, cursor 206 may mimic movement of trackball 208. In some embodiments, a user may use trackball 208 to move the cursor and make input selections on the encapsulated device 204. Selections may be made by the trackball itself or via another button, switch, lever, or the like. Using trackball 208, a user may hover over a certain target area on the interface. A selection may be made within the target area to perform a function. For example, the user may open an app on the encapsulated device. Additionally, or alternatively, the user may select an icon or target area within an opened app to perform an action. An action may be, for example, selecting an icon to take a picture within a camera app, changing settings with an app, or the like.

Figure 4:
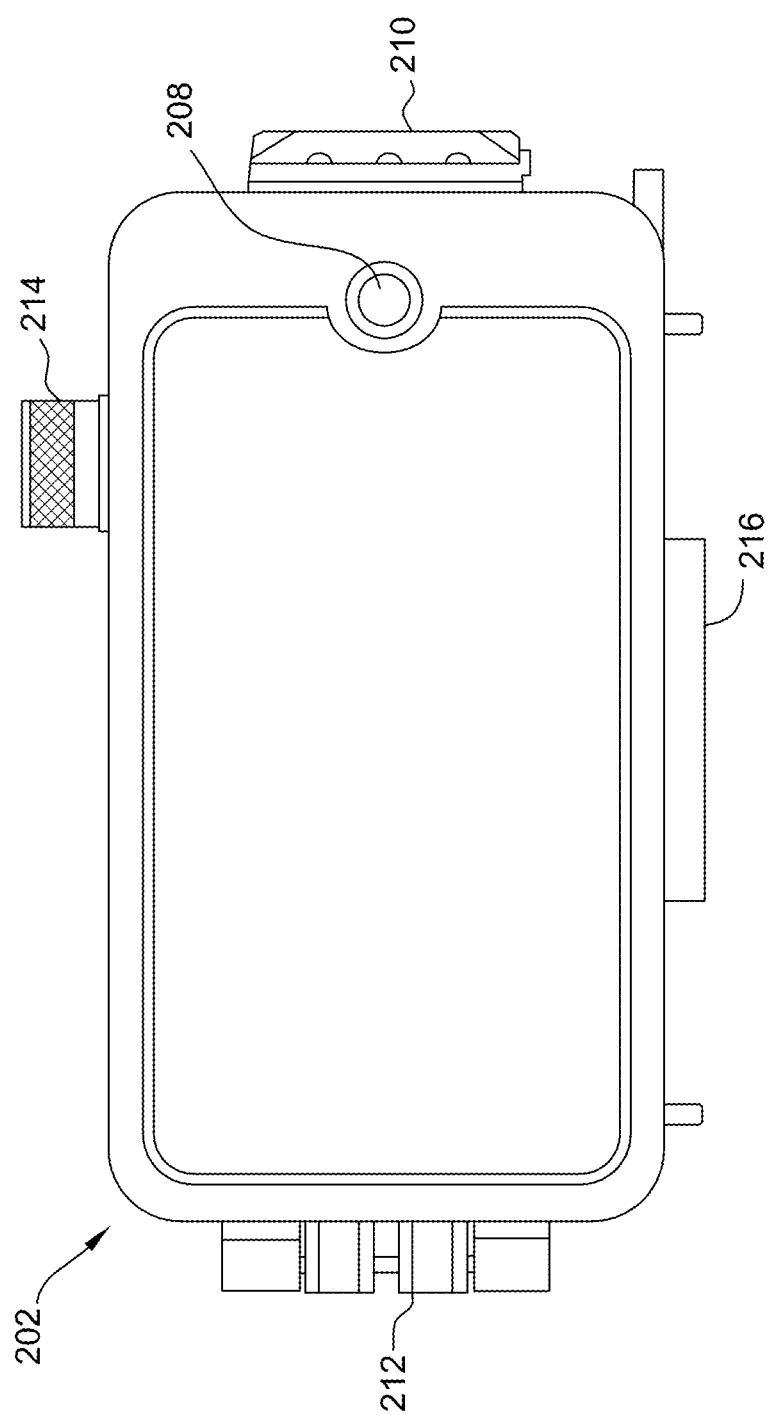
FIG. 4 illustrates another alternative rear view of the exemplary case in accordance with another embodiment of the present disclosure.

As illustrated in FIG. 4, exemplary case 202 may include a joystick 410 to perform input selections. As described above in FIG. 3, a user of case 202 may control operations of a user computing device 204 via a cursor (not shown) using joystick 410. Joystick 410 may be used to move a cursor around a display screen and interact with user computing device 204, as described above.

Figure 5:
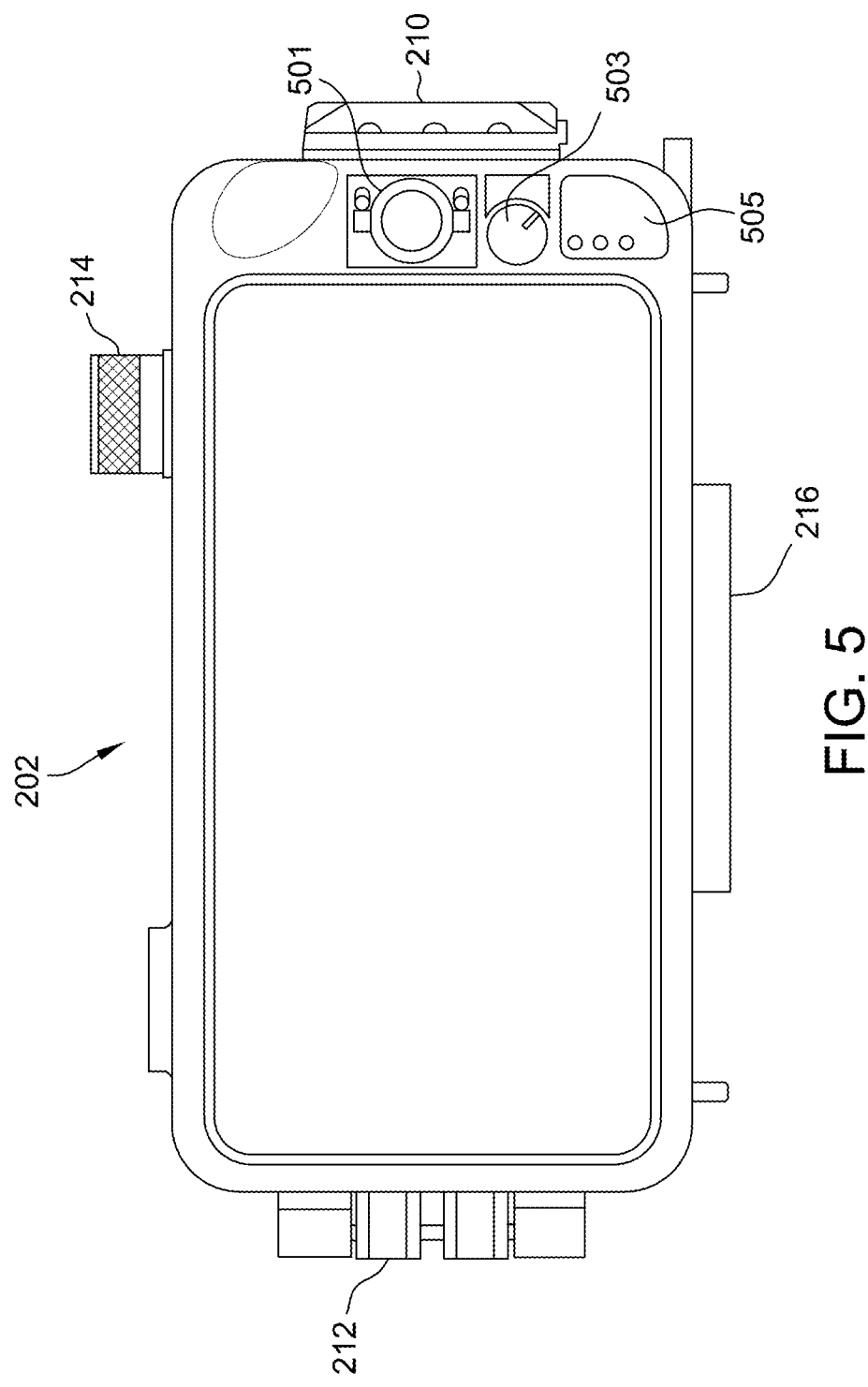
FIG. 5 illustrates yet another alternative rear view of the exemplary case in accordance with another embodiment of the present disclosure.

In some embodiments, FIG. 5 illustrates yet another alternative rear view of the exemplary case 202 in accordance with another embodiment of the present disclosure. In this example, additional features may be provided to allow further control of an encapsulated device 204. For example, an input device 501 is provided. Additionally, the input device may be a removable component. For example, input device 501 may be a removable joystick X-Y controller. Input device 501 may perform all of the functions described above and perform cursor movement to make selections on the interface of the encapsulated device.

In some embodiments, case 202 may include a dial 503. Dial 503 enables a device user to perform camera operations, for example, such as shutter operation. Additionally, or alternatively, dial 503 may be a selector dial. Further, case 202 may include one or more LED status indicator lights 505. LED status indicator lights may be used to convey different types of information to the user of the case. Conveyed information may include, but is not limited to, battery status of case 202, battery status of user computing device 204, malfunction status, pressure status, leak event, or the like.

Figure 6:
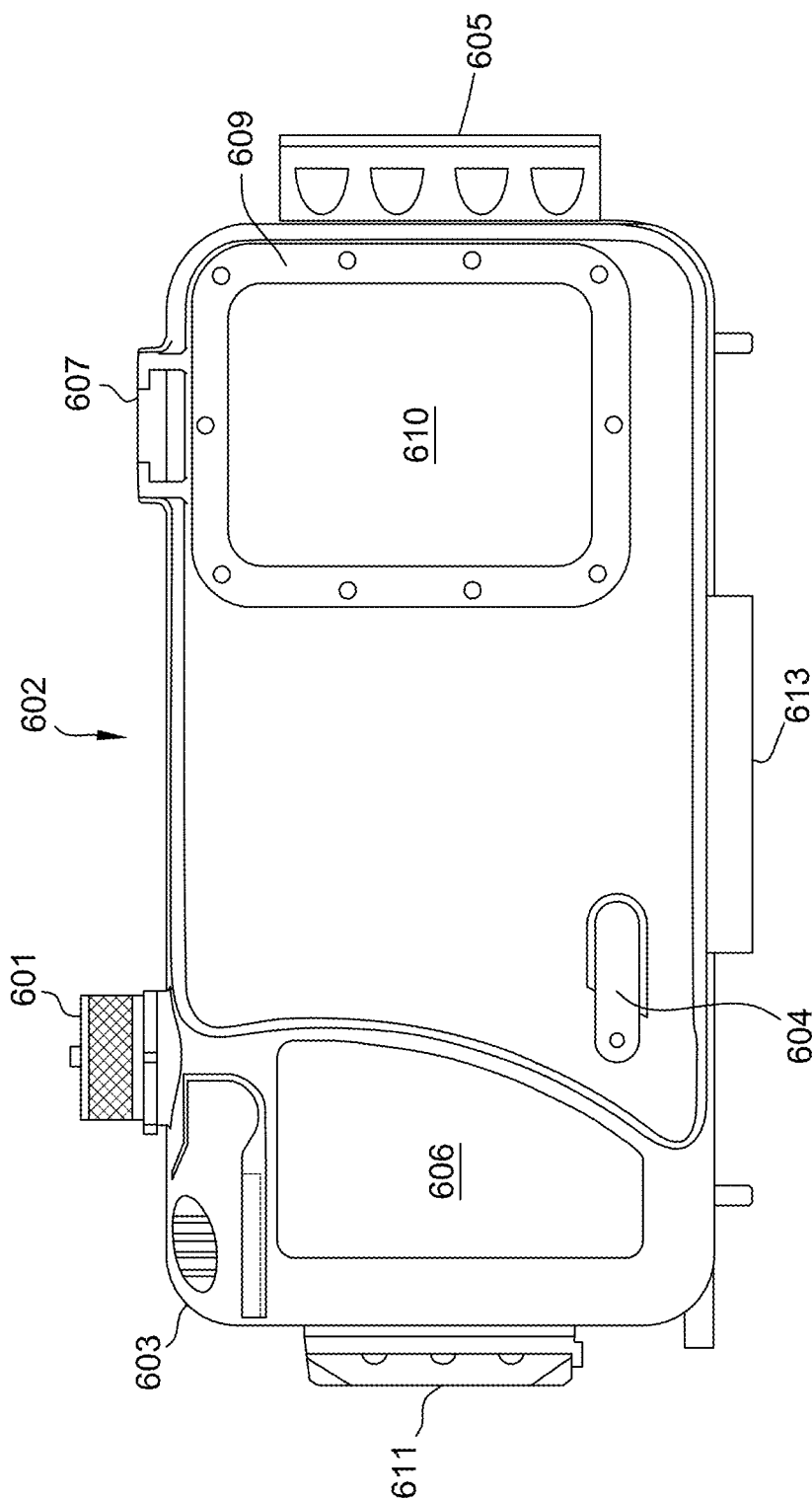
FIG. 6 illustrates a front view of the exemplary case in accordance with another embodiment of the present disclosure.

A front view of case 602 is shown in FIG. 6. Front view 602 includes a vacuum pressure port 601 for leak test analysis and a cold shoe 607 for mounting a photo-video light or other accessory. Additionally, case 202 may include a door hinge 605 having one or more grip indents and a lock 611. Lock 611 may include a rear door cam-action closing lock, for example. Additionally, or alternatively, case 602 may include a grip pad, an integrated pressure sensor 604, and a tripod mount 613. In some embodiments, the integrated pressure sensor may send pressure data to the integrated controller of case 602. Status of the device and case may be updated based on the pressure data and conveyed to the user. For example, pressure status may be conveyed to the user via lights 505, via the encapsulated device's screen, or a combination thereof. A lens border 609 is provided around a lens port 610, enabling an encapsulated device to capture images and/or other visual media.

Figure 7:
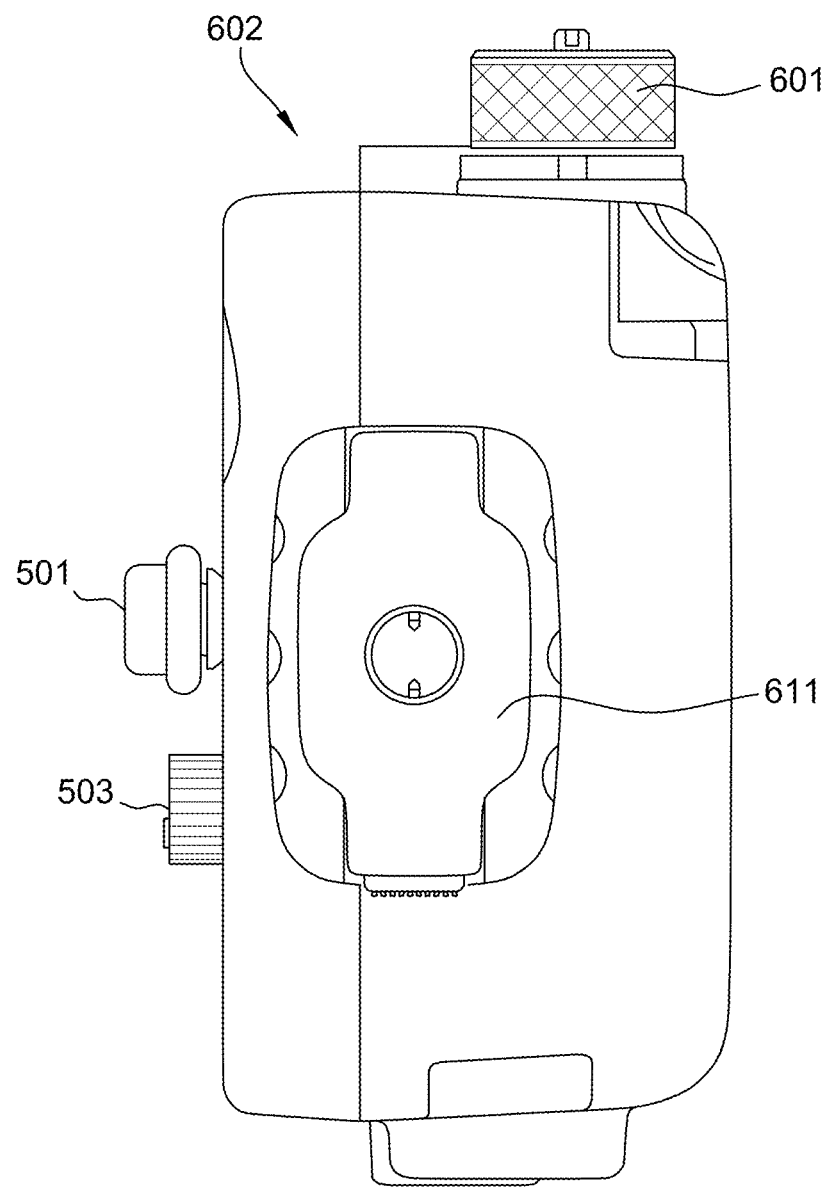
FIG. 7 illustrates a side view of the exemplary case in accordance with another embodiment of the present disclosure.

A side view of case 602 is shown in FIG. 7. As shown, case 602 may include a removable hall-effect joystick 501 with an X-Y axis cursor-moving action. The joystick may be removed from case 602. Joystick 501 may be held in place by one or more slide locks, for example. When moved to an unlock position, the slide locks enable the release of the joystick from the case. Joystick 501 may be removed from the case for replacement, for cleaning, for repair, or the like.

Additionally, or alternatively, case 602 may include a shutter/select dial for assigning function to a shutter/select lever. For example, a shutter dial may enable a user of an encapsulated device to capture a photo or start/stop video, among other types of actions. Further, the select dial may enable the user to select an object, area, or icon on the encapsulated device's screen under a cursor.

Figure 8A:
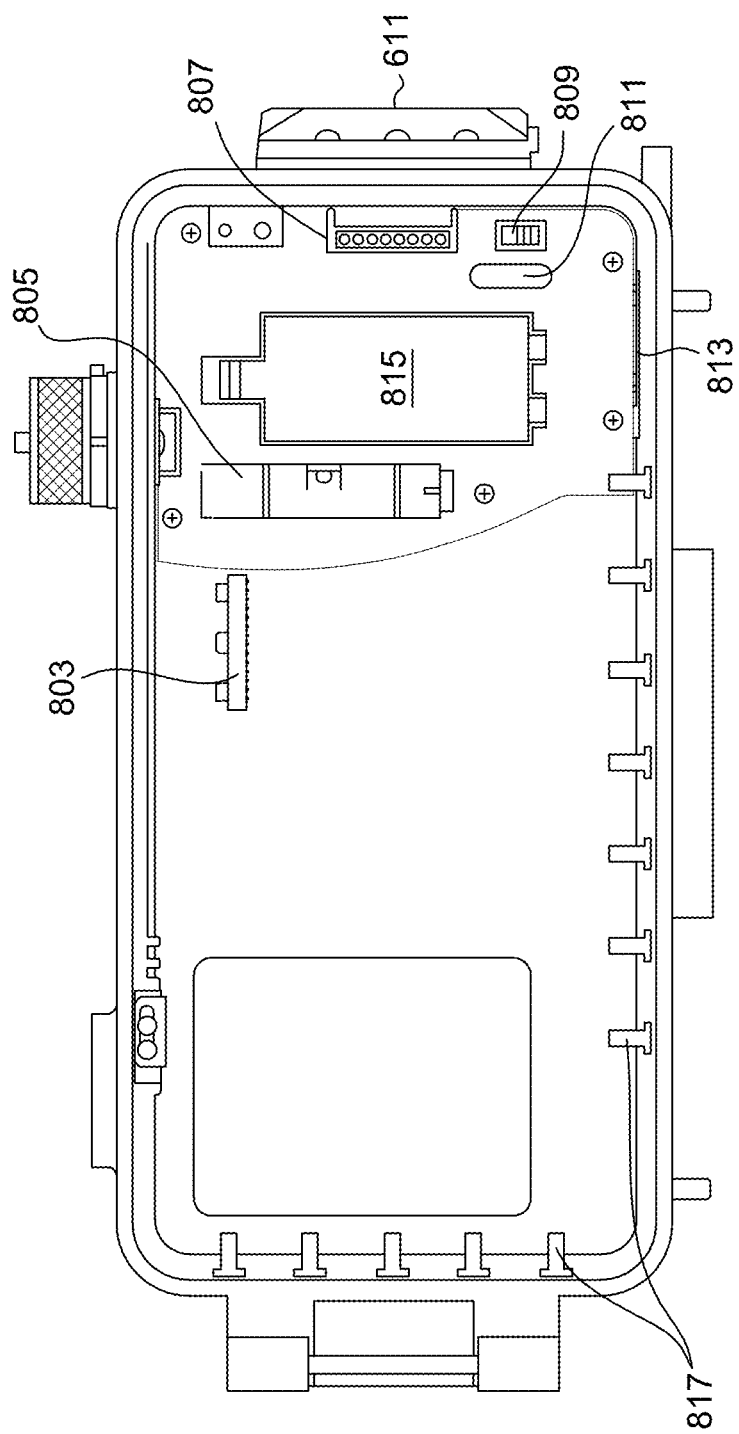
FIGS. 8A and 8B illustrate exemplary rear open views of the exemplary case in accordance with yet another embodiment of the present disclosure.
Figure 8B:
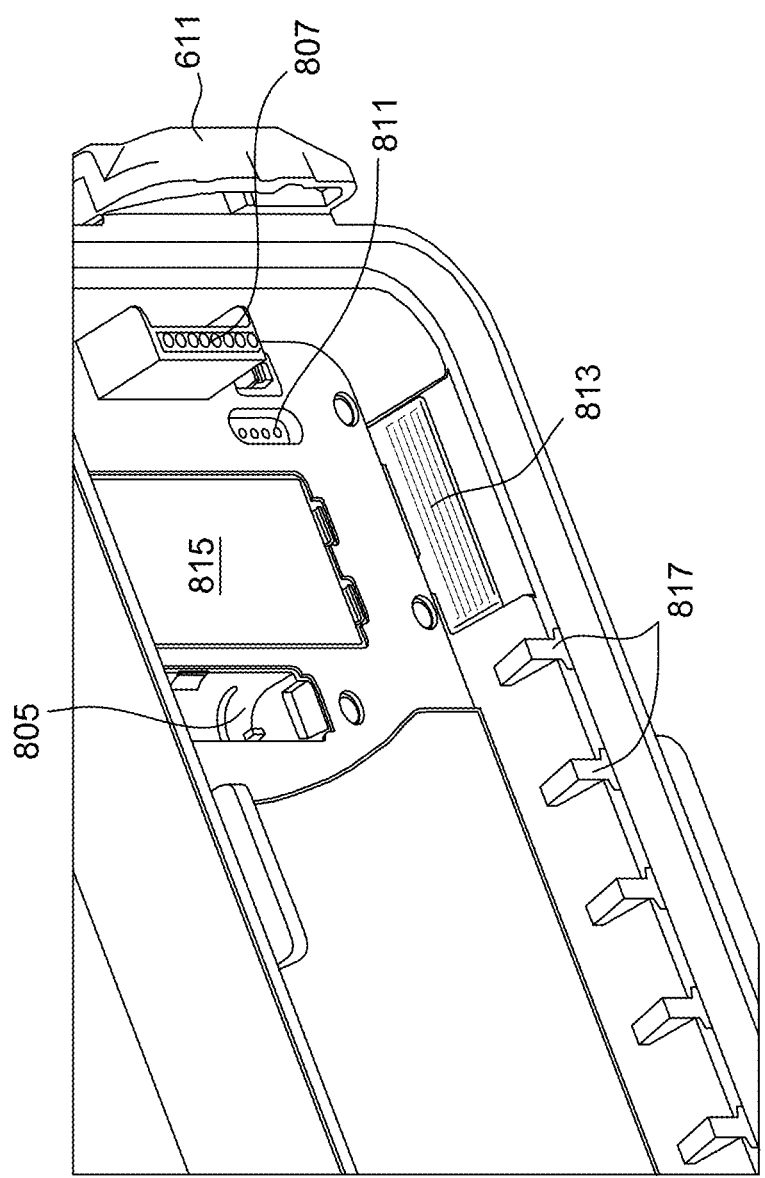

FIGS. 8A and 8B illustrate exemplary rear open views of the exemplary case showing internal components of the case. As shown in FIGS. 8A and 8B, a holding spring 803 is provided having a rubber grip pad to hold a device securely in place. Cavity 805 is provided to hold a moisture muncher desiccant to prevent internal fogging. One or more electrical contacts 807 (i.e. pogo pins) may be provided for connecting one or more rear door controls to main body circuitry. The case may include an on/off power switch 809 to control power of the case, a firmware update port 811, a wet sensor 813 to detect water intrusion, and a battery compartment 815. Finally, the underwater case, in some embodiments, may include one or more removable rubber grip tabs 817. The rubber grip tabs may be tapered at an angle to hold a device in place. Additionally, or alternatively, rubber grip tabs 817 may differ in size based on a device's size (e.g., S, M, L).

Figure 9:
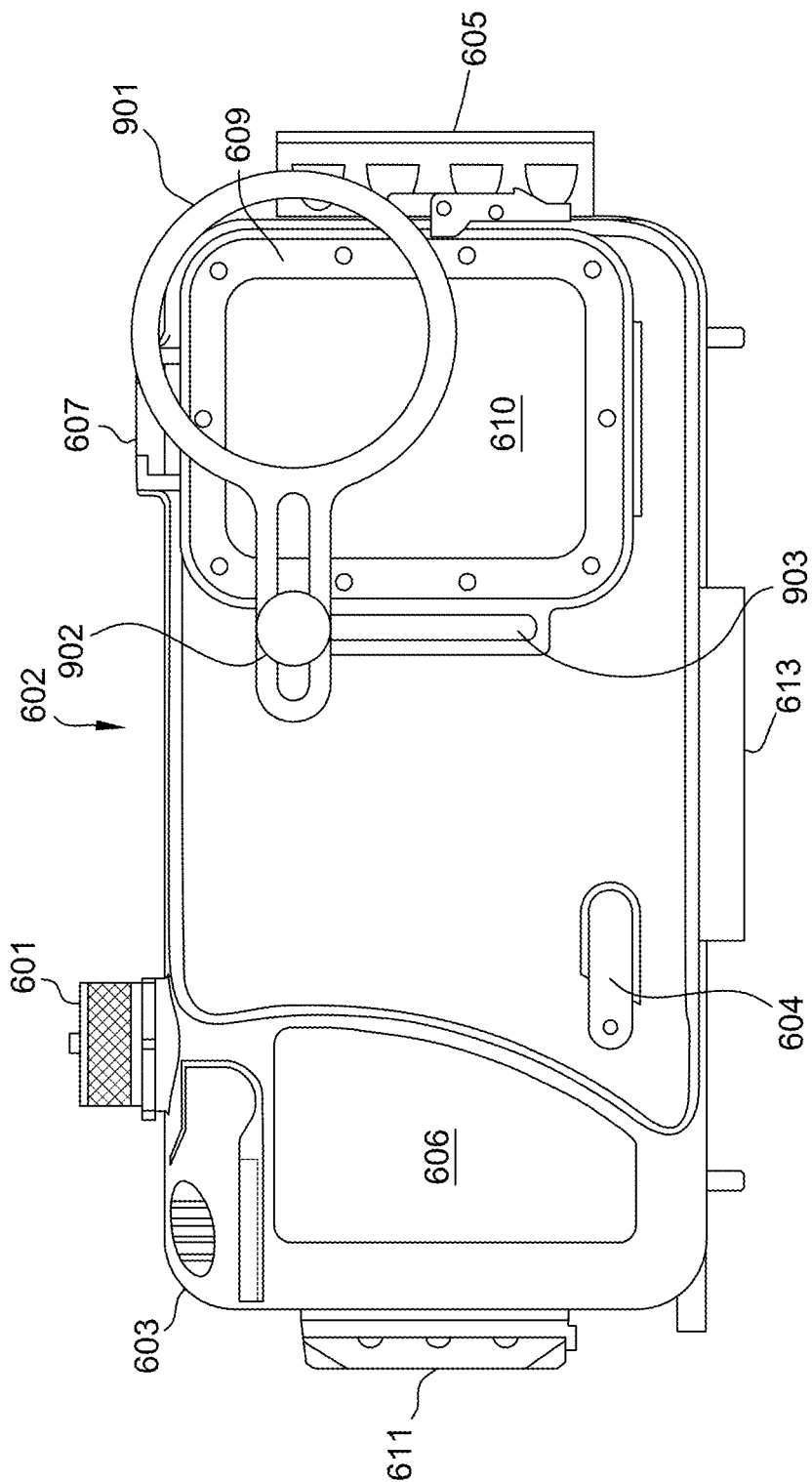
FIG. 9 illustrates an exemplary case with a lens holder accessory in accordance with yet another embodiment of the present disclosure.

As shown in FIG. 9, case 202 may include a lens holder accessory 901. In some embodiments, lens holder 901 may be attached to a housing lens port frame of the case. Additionally, lens holder 901 may be used to attach a lens to the case. For example, a wide-angle or close-up lens accessory may be attached to the case via lens holder 901. Other types of lenses may be attached, such as a fisheye lens, for example. The type of lens that may be attached is not meant to be limiting. Lens holder 901 may be moved along an X-Y axis via locking bolt 902 moving holder left and ride and up and down slide 903.

Figure 10:
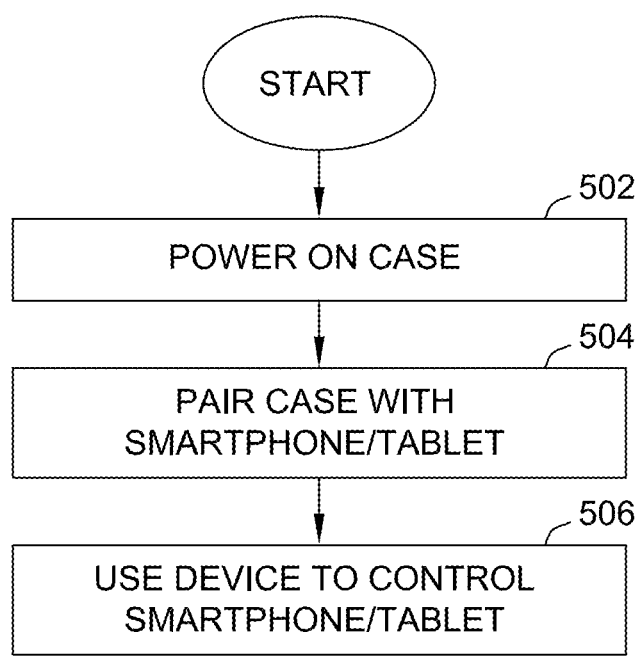
FIG. 10 illustrates an exemplary process in accordance with at least one embodiment of the present disclosure.
Figure 11:
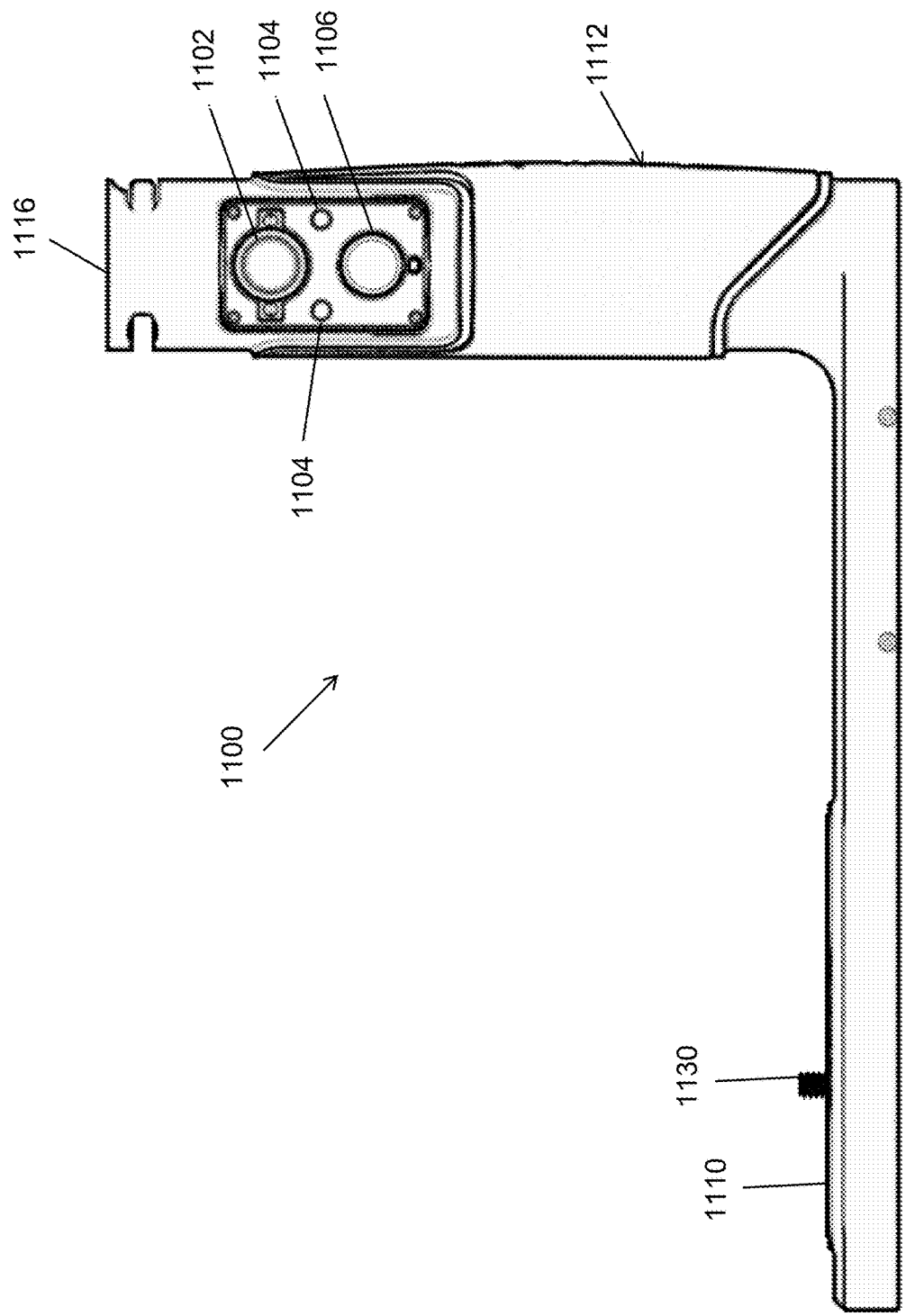
FIG. 11 illustrates a rear view of an exemplary controller grip in accordance with an embodiment of the present disclosure.
Figure 12:
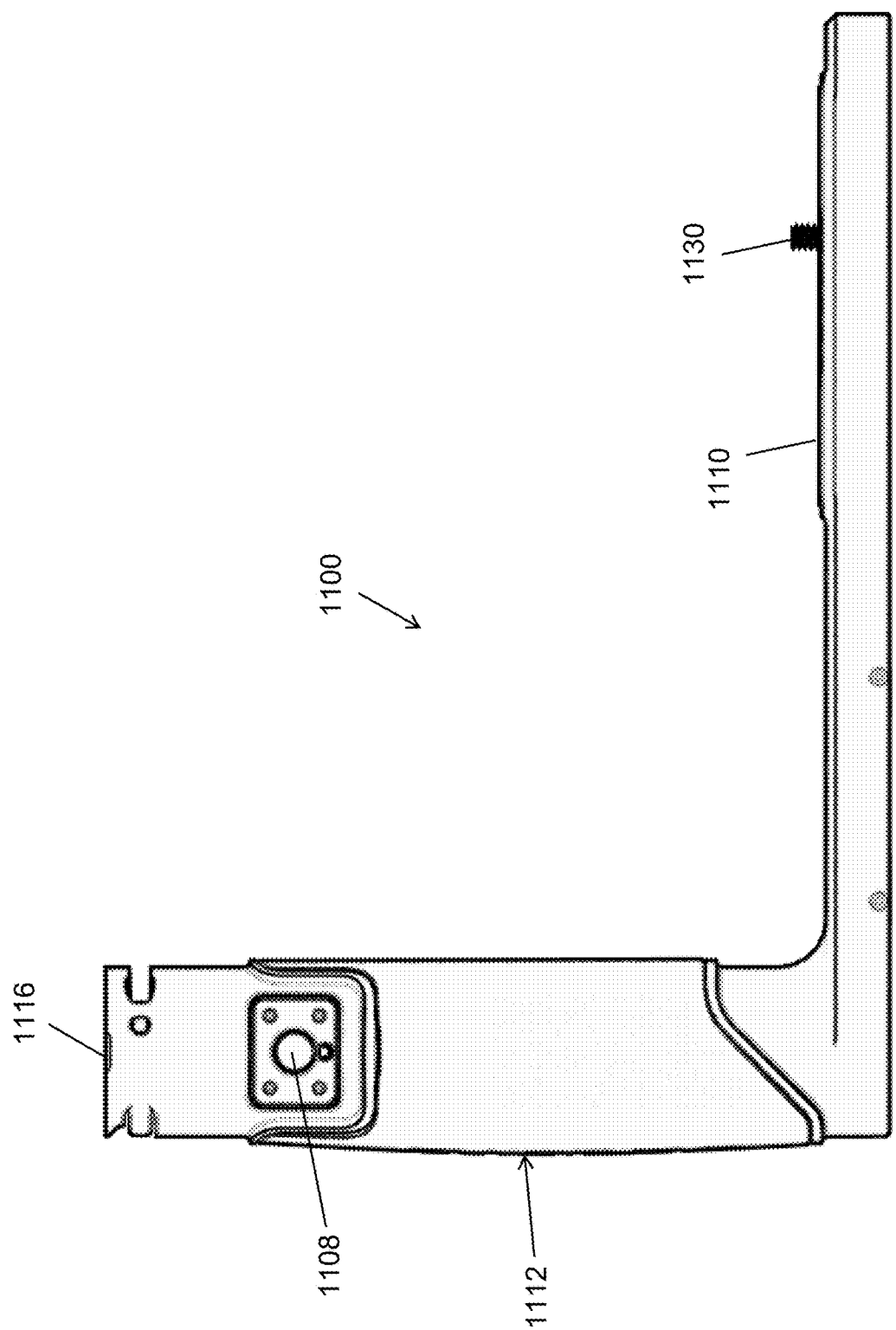
FIG. 12 illustrates a front view of the exemplary controller grip in accordance with an embodiment of the present disclosure.
Figure 13:
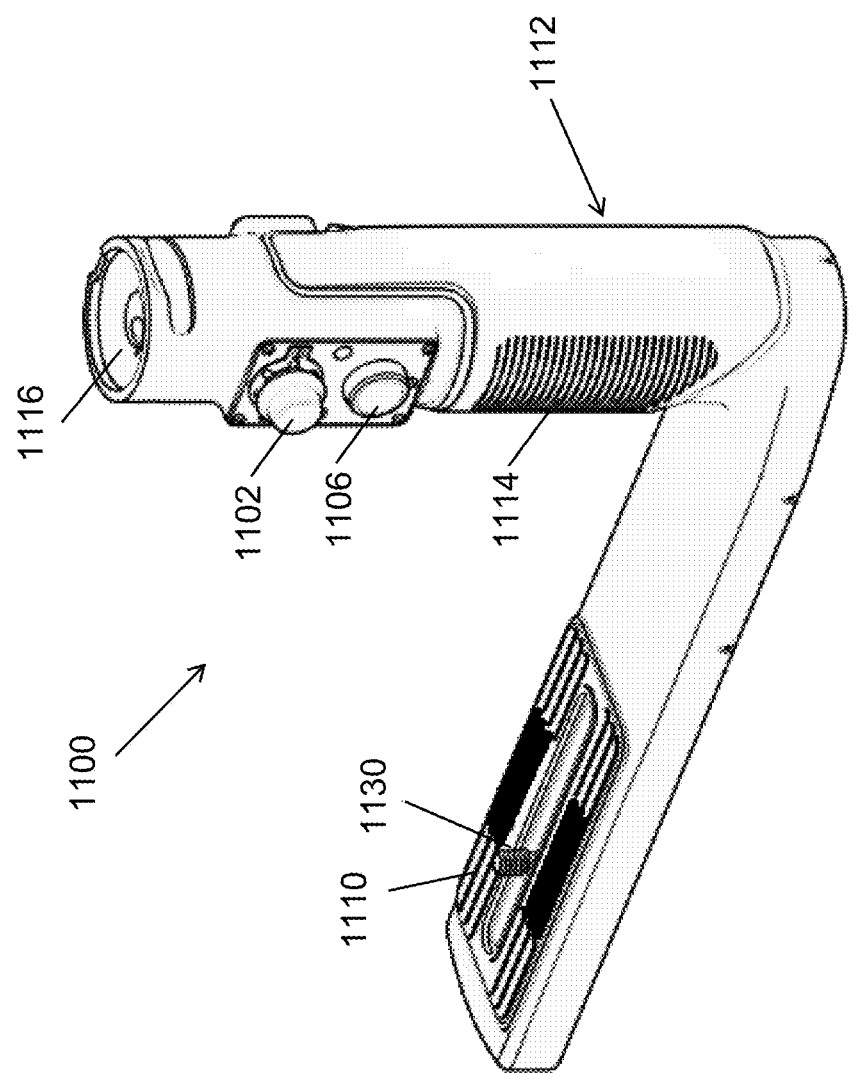
FIG. 13 is a rear perspective view of the exemplary controller grip in accordance with an embodiment of the present disclosure.

FIG. 10 illustrates an exemplary process in accordance with at least one embodiment of the present disclosure. An underwater case may encapsulate a device for use in wet and dry conditions, such as underwater, extreme hot or cold conditions, or the like. The underwater case may include one or more waterproof seals to keep an encapsulated device safe from the elements. The case may include a controller including a non-volatile memory and processor. Upon power on 502, radio module may provide a short-range wireless connection between the controller and the device. Once connected, the case may pair 504 with the encapsulated device. In some embodiments, the case may pair with the device via a Bluetooth® connection, or the like, via an integrated connection module. Additionally, or alternatively, the integrated connection module may activate the device. The case may include one or more input components, described herein, that may be used to control 506 the encapsulated device. As a user makes one or more inputs, such as from a joystick or trackball, instructions may be transmitted from the case to the device.

FIG. 11-15 illustrate a controller grip 1100 in accordance with embodiments of the present disclosure. Controller grip 1100 is configured to remotely control applications on a user computing device, as discussed in more detail below. More particularly, controller grip 1100 may be used to remotely control applications on a user computing device when the user computing device is sealed inside a waterproof enclosure. Controller grip 1100 may be waterproof up to a certain depth (e.g., up to 200 feet), and therefore may be used to remotely control applications on a user computing device in underwater environments. In some embodiments, controller grip 1100 is powered by one or more batteries. Waterproof cap 1134 may be removed to access a battery compartment.

It will be appreciated by those skilled in the art that the controller grip described herein may be use in underwater environments but may also be suitable for other applications where a mobile device, for example needs to be in a sealed case. For example, the controller grip may be used with an enclosed user computer device in any environment that could experience extremes in temperature and/or debris or fluids. Examples include, but are not limited to, industrial sites that create dust, meat processing plants, chemical manufacturing, crime scenes, construction sites, food preparation, and the like.

Controller grip 1100 may have an integrated Bluetooth®, near-field communications (NFCs) and/or any radio frequency transmitter used to wirelessly connect, communicate with and control applications on a user computing device. The transmitter maintains a stable, short-range wireless connection while underwater.

In some embodiments, controller grip 1100 comprises a mounting tray 1110 and a shaft 1112 coupled to mounting tray 1110. Mounting tray 1110 is configured to attach to a case (e.g., case 202 shown in FIG. 2, case 602 shown in FIG. 6, etc.) containing a smartphone or tablet. For example, in the embodiment illustrated in FIGS. 11-15, mounting tray 1110 is joined to a case via a slidable wing style handle screw 130. However, the mount may be attached to controller grip 1100 via a variety of mechanical means such as clips, locks, screws, and other mechanical attachment means. In some embodiments, mounting tray 1110 may contain the transmitter used to wirelessly connect, communicate with and control applications on a user computing device, as discussed above. Shaft 1112 may optionally comprise a grip 1114 for comfort and better grip of the controller grip 1100.

Controller grip 1100 further comprises one or more cursor-moving and/or selection elements. The cursor-moving element may be anything that moves the smartphone/tablet's cursor in a X and Y manner, like an optical or mechanical trackball, mouse, joystick, touchpad or up/down/left/right buttons, or the like. For example, in the embodiments illustrated in FIGS. 11-15, a user may control an input cursor via joystick 1102. More particularly, joystick 1102 may be configured to move a cursor on an interface of the user computing device on an X-Y axis corresponding to input by a user.

Figure 14:
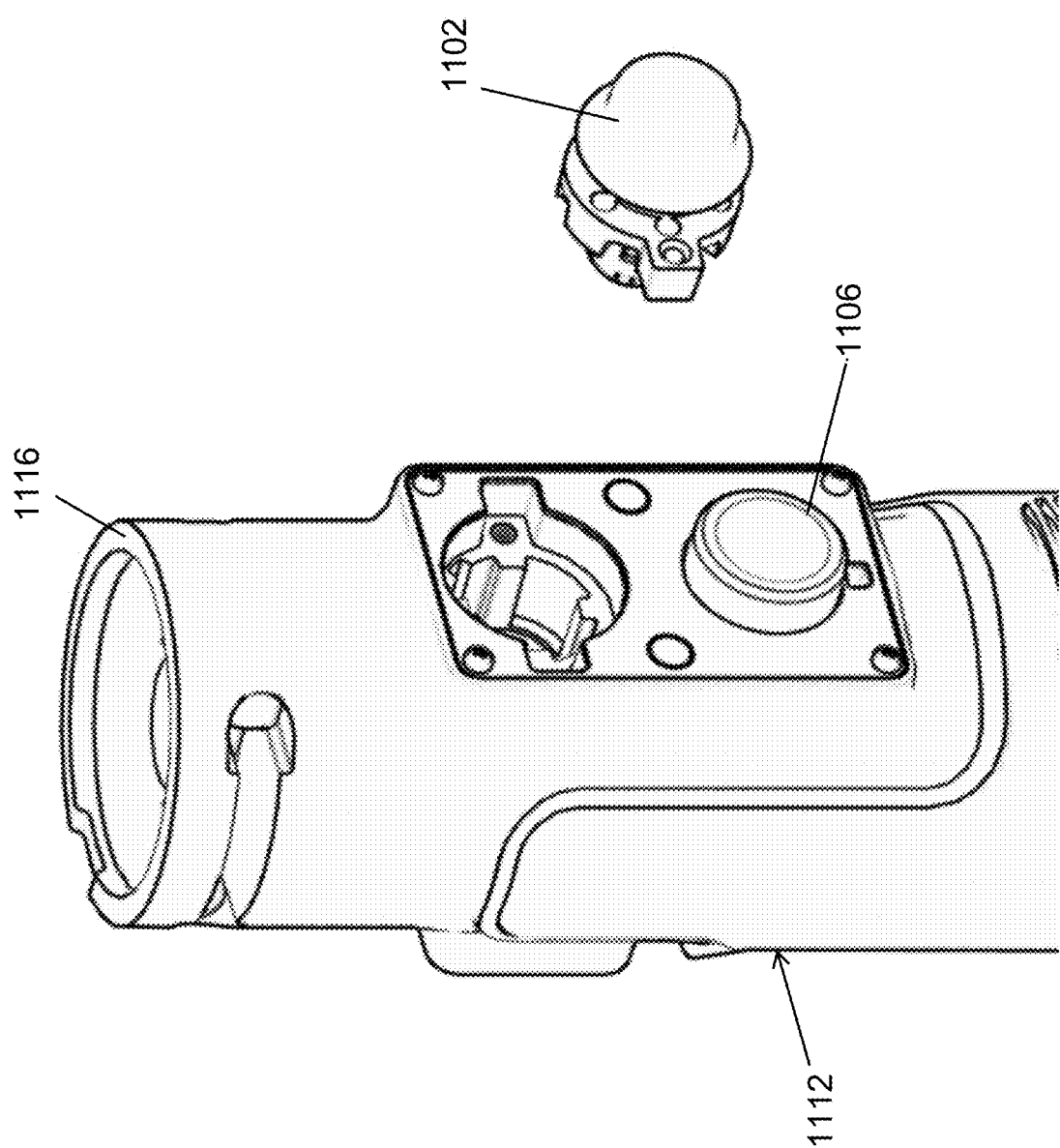
FIG. 14 is a rear perspective view showing removable joystick of the exemplary controller grip in accordance with an embodiment of the present disclosure.
Figure 15:
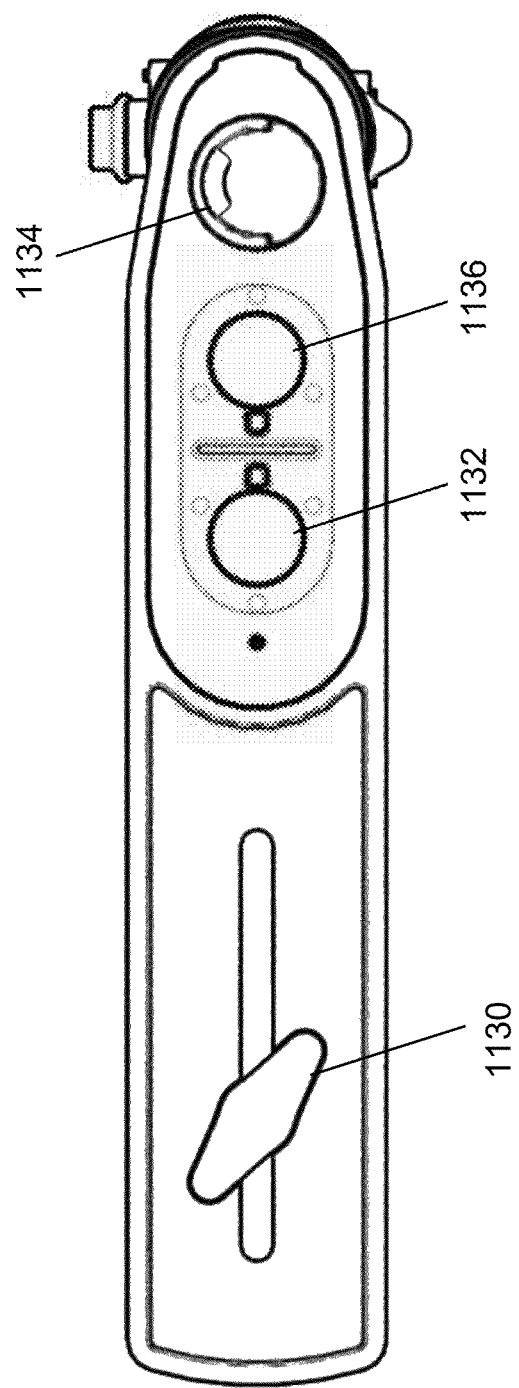
FIG. 15 is a bottom view of the exemplary controller grip in accordance with an embodiment of the present disclosure.

In some embodiments, joystick 1102 may comprise a removable hall-effect joystick with an X-Y or X-Y-Z axis cursor-moving action. The joystick may be removed from controller grip 1100, as illustrated in FIG. 14. Joystick 1102 may be held in place by one or more slide locks, for example. When moved to an unlock position, the slide locks enable the release of the joystick from the case. Joystick 1102 may be removed from controller grip 1100 for replacement, for cleaning, for repair, or the like. Controller grip 1100 may further comprise one or more buttons 1136 for controlling cursor speed and/or calibrating joystick 1102 to a center position.

Selecting ("clicking") the target may be achieved in a couple of ways. The input cursor may have Z-axis movement, so pushing or pulling the cursor may send a select command to the user computing device. A separate button, lever or switch integrated into the underwater case may be used to send select command to the smartphone/tablet. For example, controller grip 1110 may further comprise a select button 1108 configured to select an object on an application on the user device, as illustrated in FIGS. 11-15. Hovering the cursor over an area on the display and pushing select button 1108 will select an object, similar to touching the display to select an object. Pushing and holding select button 1108, and moving joystick 1102 will drag an object across the display.

Controller grip 1100 may include one or more LED status indicator lights 1104. LED status indicator lights 1104 may be used to convey different types of information to the user of controller grip 1100. Conveyed information may include, but is not limited to, battery status of controller grip 1100, a battery status of the user computing device, malfunction status, pressure status, leak event, Bluetooth® connection, battery strength, cursor speed setting, joystick calibration, and the like.

In some embodiments, controller grip 1100 comprises a shutter button 1106. Shutter button 1106, when depressed, will capture a photo, video, or the like, using the native camera application of the user computing device.

In some embodiments, controller grip 1100 comprises a cold shoe or other mount 1116 configured to mount a photo-video light or other accessory.

In some embodiments, controller grip 1100 further comprises a computing device (not shown). The controller grip computing device may comprise a controller comprising a non-volatile memory and processor. The controller may be configured to wirelessly transmit the dive data (e.g., depth, bottom time, no decompression stop time, accent rate etc.) to the user computing device via the short-range wireless connection (e.g., Bluetooth®, near-field communications (NFCs), etc.) between the controller and the user computing device. The user computing device may have installed an application to display the dive data received from the controller grip computing device. In some embodiments, controller issues a signal based on the measured water depth and a time variable. The signal includes an alert of a user's no decompression stop time, a bottom time, an ascent rate, a surface interval time, a no-fly time, a dive log, or a combination thereof. Additionally, or alternatively, the dive data may be viewable on a display on the controller grip. One advantage to having an independent computing device integrated in the controller grip 1100 is that is serves as a back-up in the event the user computing device runs out of power, a user computing device native application crashes, and the like.

In some embodiments, controller grip 1100 comprises a pressure sensor 1132. Pressure sensor 1132 may be configured to continuously measure water depth. Pressure sensor 1132 may be further configured to transmit the measured water depth to the user computing device, thereby providing an indicator of the ascent/descent rate. For example, pressure status may be conveyed to the user via LED status indicator lights 1104, via the encapsulated user computing device's display, or a combination thereof.

In some embodiments, controller grip 1100 comprises a signaling device (not shown) configured to get the attention of other divers. For example, the signal device may comprise a noisemaker. In some embodiments, controller grip 1100 comprises an integrated analog or digital compass.

Figure 16:
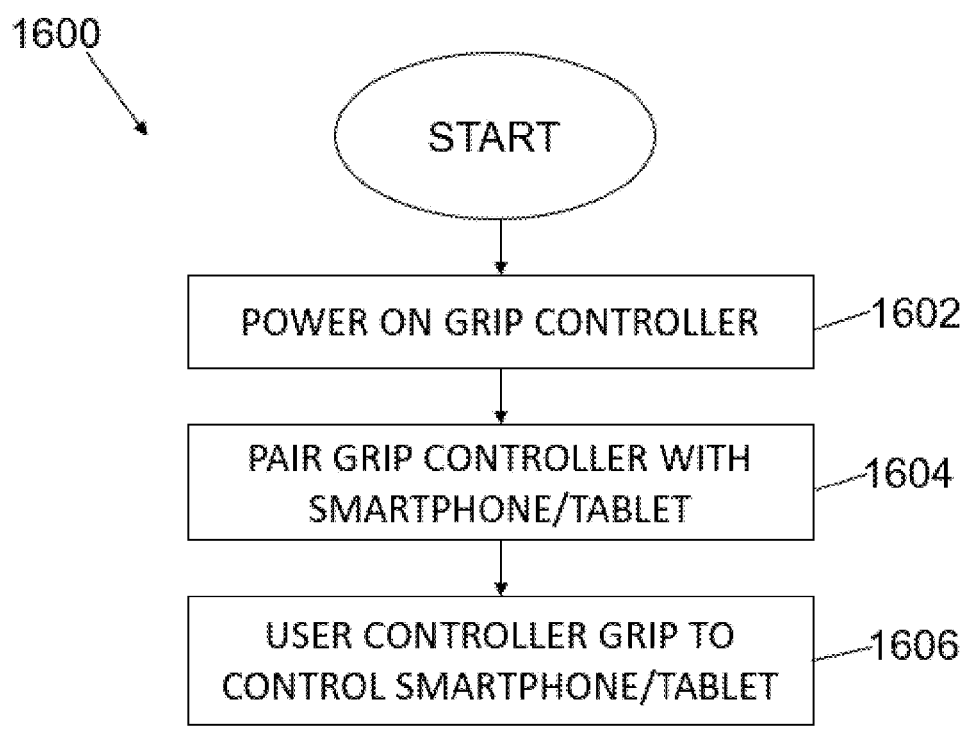
FIG. 16 illustrates an exemplary process in accordance with at least one embodiment of the present disclosure.

FIG. 16 illustrates an exemplary process in accordance with at least one embodiment of the present disclosure. Controller grip is configured to attach to a case which encapsulates a user computing device for use in wet and dry conditions, such as underwater, extreme hot or cold conditions, or the like. The underwater case may include one or more waterproof seals to keep an encapsulated device safe from the elements. The controller grip may include a controller comprising a non-volatile memory and processor. Upon power on 1602, radio module may provide a short-range wireless connection between the controller and the user computing device. Once connected, the controller grip may pair 1604 with the encapsulated user computing device. In some embodiments, the controller grip may pair with the user computing device via a Bluetooth® connection, or the like, via an integrated connection module. Additionally, or alternatively, the integrated connection module may activate the device. The controller grip may include one or more input components, described herein, that may be used to control 1606 the encapsulated user computing device. As a user makes one or more inputs, such as from a joystick or trackball, instructions may be transmitted from the case to the device.

It is appreciated that exemplary computing system 100 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

The invention claimed is:

1. An underwater controller grip comprising:
    a controller comprising a non-volatile memory and processor, the controller comprising a radio module configured to provide a short-range wireless connection between the controller and a user computing device;
    a mounting tray to contain the radio module, the mounting tray configured to maintain the short-range wireless connection while underwater; and one or more input components configured to receive one or more inputs, the controller configured to transmit an instruction to the user computing device based on the one or more inputs.

2. The underwater controller grip of claim 1, wherein at least one of the one or more input components comprise a joystick, trackball, or other X-Y or X-Y-Z cursor moving device assembly.

3. The underwater controller grip of claim 2, wherein the joystick, trackball, or other X-Y or X-Y-Z cursor moving device assembly is removable.

4. The underwater controller grip of claim 1, wherein at least one of the one or more input components comprise a select button figured to select an object on the user computing device.

5. The underwater controller grip of claim 1, wherein at least one of the one or more input components comprise a shutter button configured capture a photo or video using a native camera application of the user computing device.

6. The underwater controller grip of claim 1, wherein the one or more input components are removable.

7. The underwater controller grip of claim 1, further comprising a mount configured to receive a lighting device.

8. The underwater controller grip of claim 1, wherein the user computing device is at least one of a camera, a mobile device, a smartphone device, and a tablet.

9. The underwater controller grip of claim 1, wherein the user computing device is enclosed in a case that is mounted on the mounting tray.

10. The underwater controller grip of claim 1, further comprising:
an integrated pressure sensor configured to:
continuously measure water depth; and
transmit, via the radio module, measured water depth to the device.

11. The underwater controller grip of claim 10, wherein the controller is further configured to issue a signal based on the measured water depth and a time variable.

12. The underwater controller grip of claim 11, wherein the signal includes an alert of a user's no-decompression-stop time, a bottom time, an ascent rate, a surface interval time, a no-fly time, a dive log, or a combination thereof.

13. The underwater controller grip of claim 1, further comprising a cold shoe configured to mount a photo-video light or other accessory.

14. The underwater controller grip of claim 1, further comprising one or more LED status indicator lights.

15. The underwater controller grip of claim 14, wherein the one or more LED status indicator lights comprise indicate at least one of of a battery status of the controller grip, a battery status of the user computing device, a malfunction, a pressure status, a leak event, a connection with the user computing device, a cursor speed setting, or a joystick calibration.

16. The underwater controller grip of claim 1, wherein the controller grip is waterproof up to a depth of 200 feet underwater.

17. A method for using a user computing device in an underwater environment, the method comprising:
placing the user computing device in a case having at least one waterproof seal;
mounting the case on a controller grip comprising a controller and one or more input components connected to the controller, the controller comprising a non-volatile memory, a processor, and a radio module configured to provide a short-range wireless connection between the controller and the user computing device; and
pairing the user computing device with the controller; and
receiving one or more inputs from a user through the one or more input components; and
transmitting an instruction to the user computing device based on the one or more inputs.

18. The method of claim 17, wherein the one or more inputs cause a cursor of the user computing device to move.

19. The method of claim 17, wherein the one or more inputs cause a native application of the user computing device to take a photo or video.

20. The method of claim 17, wherein the user computing device is at least one of a camera, a mobile device, a smartphone device, and a tablet.

* * * * *